(No Model.) 2 Sheets—Sheet 1.
M. COVEL.
SAW JOINTING AND SWAGING DEVICE.
No. 259,372. Patented June 13, 1882.
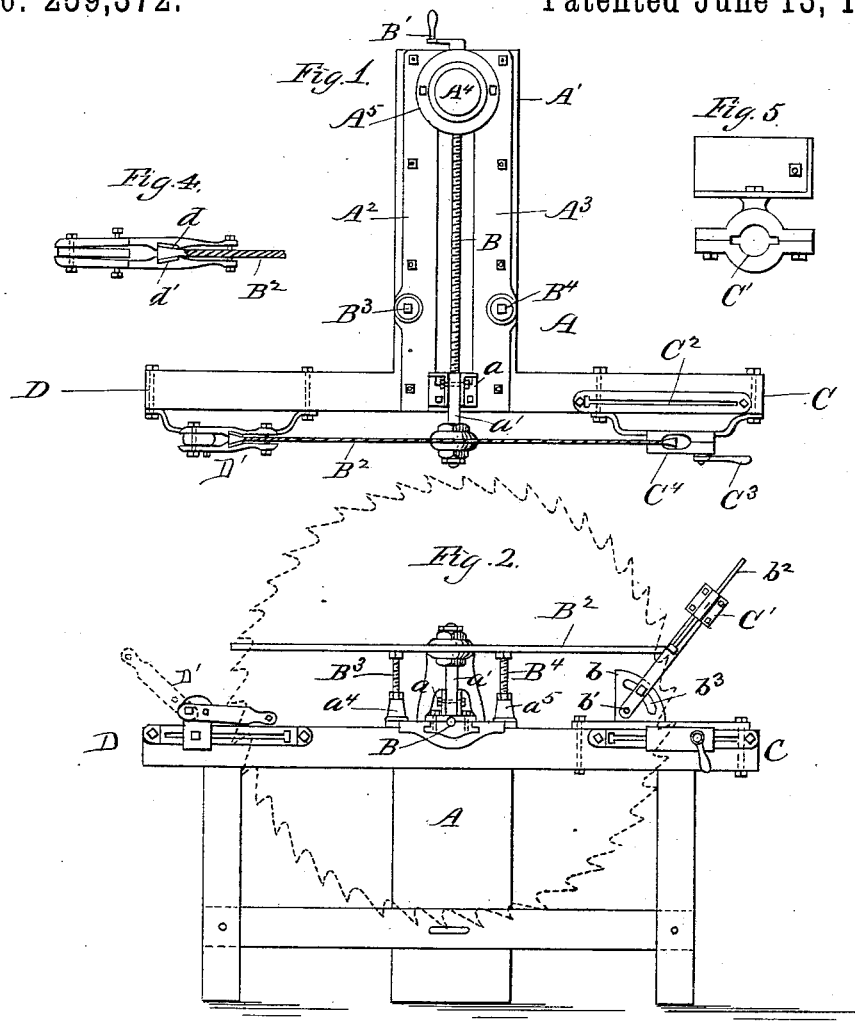
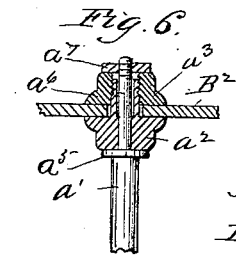
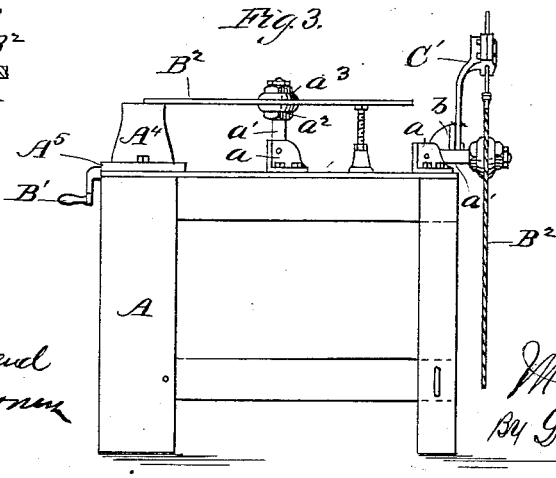

(No Model.) 2 Sheets—Sheet 2.
M. COVEL.
SAW JOINTING AND SWAGING DEVICE.
No. 259,372. Patented June 13, 1882.
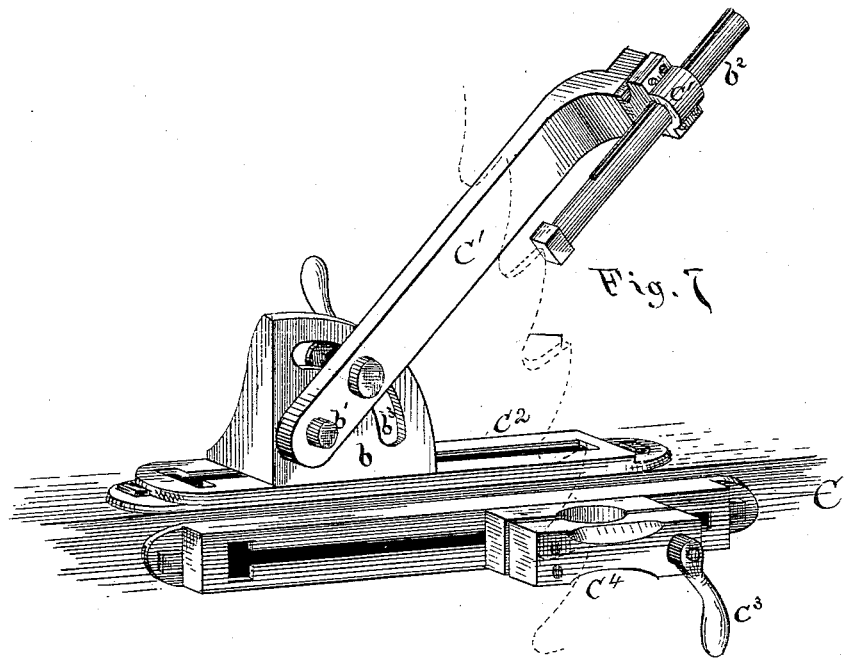
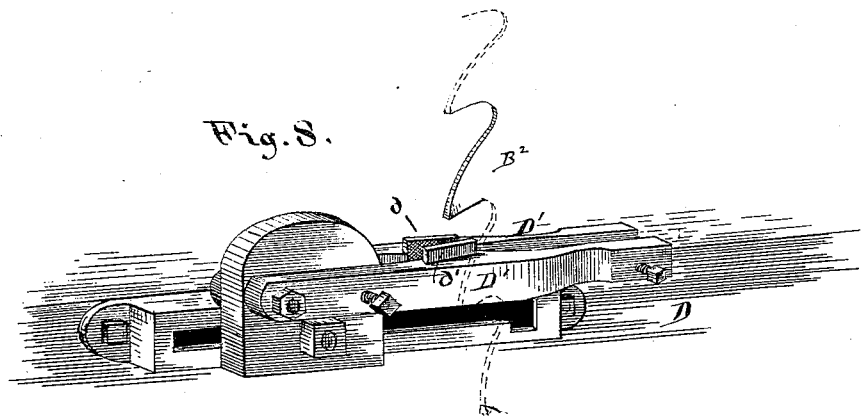
Attest
J. C. Turner
Aug. Jordan
Inventor
Milo Covell
By his Atty
R. D. O. Smith

UNITED STATES PATENT OFFICE.

MILO COVEL, OF CHICAGO, ILLINOIS.

SAW JOINTING AND SWAGING DEVICE.

SPECIFICATION forming part of Letters Patent No. 259,372, dated June 13, 1882.

Application filed February 20, 1882. (No model.)

*To all whom it may concern:*

Be it known that I, MILO COVEL, of Chicago, in the county of Cook and State of Illinois, have invented certain new and useful Improvements in a Saw-Bench; and I do hereby declare the following to be a full, clear, and exact description of the invention, that will enable others skilled in the art to which it appertains to make and use the same, reference being had to the accompanying drawings, and to letters of reference marked thereon, forming a part of this specification.

The object of this invention is to provide a useful and convenient saw-bench for holding saws during the process of dressing, which consists of a T-shaped frame-work of the required height, and provided with an anvil, on which the saw-plate may be hammered, an upset device, and a jointer so arranged as to enable the operator to dress saws with facility.

Figure 1 is a top view embodying my improvement; Fig. 2, a front elevation; Fig. 3, an end view. Figs. 4 and 5 are top views of the saw jointer and upset, respectively, and Fig. 6 is a section of the collars clamping the saw and their position relative to the arbor. Fig. 7 is a perspective view of the upset and holding device. Fig. 8 is a perspective view of the side jointer.

Referring to the drawings, A represents a bench or supporting frame-work, consisting of suitable timbers framed together. The top of the part A', forming the trunk or main part of the T-shaped bench, is covered by the metal plates $A^2$ $A^3$, the inner edges of which project slightly beyond the bedding-timbers. Close to the end of this part of the bench is located the anvil $A^4$, a top view of which is shown in Fig. 1 and an elevation in Fig. 3 of the drawings.

The base of the anvil rests in an inclosing flanged socket, $A^5$, bolted to the frame, and when the anvil is in actual use the same may be readily removed out of the way to prevent the polished face from being accidentally marred or injured.

The endless screw B is rotated by the hand-crank B', and is adapted to carry the traversing slide $a$, which travels back and forth in accordance with the rotation of the endless screw. The lower part of the slide is provided with flanges which embrace the inner edges of the plates $A^2$ $A^3$, and serve as guides to retain the slide $a$ in proper relation thereto, readily allowing a longitudinal but not a lateral movement, as shown in Fig. 2 of the drawings. Pivoted to the slide $a$ is the saw arbor or mandrel $a'$, which serves the purpose of holding the saw when being dressed. This arbor is capable of being converted into either a horizontal or vertical position, as may be required. Fig. 1 shows the arbor in a horizontal position, the saw resting in a vertical plane, in which position the teeth of the saw are operated upon by the upset and jointer. Fig. 3 shows the arbor in both positions, $B^2$ representing the saw in the different positions and figures.

The saw is secured to the arbor by means of the clamping-collars $a^2$ $a^3$. (Shown in Fig. 6 of the drawings.) The lower collar, $a^2$, rests against the flange or shoulder $a^5$, and is provided with the upward or outward projecting sleeve $a^6$, which incloses the upper end of the arbor, and is threaded for the reception of the collar $a^3$. The sleeve $a^6$ should come up flush with or a little beyond the collar $a^3$, so as to allow the clamping-nut $a^7$ to engage with the threaded end of the arbor and have a bearing thereon. This arrangement permits the saw and collars to revolve while the arbor remains stationary.

The leveling stud-bolts $B^3$ $B^4$ are adapted to have a vertical adjustment and to engage with the interior threaded socket-stands, $a^4$ $a^5$, these bolts serving the purpose of leveling the saw in a horizontal position relative to the hammering-face of the anvil.

To the top and end C of the frame is attached the bracket $b$, to which is pivoted, at $b'$, the lower end of the upset-holder C', which carries the upset-spindle $b^2$.

The bracket $b$ is provided with the segmental slot $b^3$, which permits of the adjustment of the upset to any required angle relative to the teeth of the saw. This bracket has a longitudinal adjustment in the groove $C^2$, and may be moved in or out in accordance with the diameter of the saw which is being operated upon. Attached to the outer side of this part of the bench-frame is the vise $C^4$, operated by the handle $C^3$, and serves to clamp and hold the saw during the process of dressing the same, as may be required. To the opposite end, D, of the frame is attached the saw-jointing device D'. This jointer, when not in use, may be thrown back out of the way, as indicated by the dotted lines in Fig. 2 of the drawings.

In Fig. 4, $d$ $d'$ represent the files used in jointing and dressing the sides of the teeth, and shows the angle at which the files are set relative to the teeth of the saw. This arrangement combines conveniently all the mechanism ordinarily required in dressing a saw.

The saw is first placed upon the arbor in a horizontal position, resting on the anvil and leveling-bolts, the saw-plate being here tested and brought to the proper shape, after which the slide carrying the saw arbor or mandrel is moved out to the front side of the bench-frame by rotating the endless screw, and the saw made to assume a vertical position through the medium of the adjustable saw-arbor. The saw is next operated upon by the upset, and finished in the jointing device.

Having thus described my invention, what I claim, and desire to secure by Letters Patent, is—

1. The combination, in a saw-bench, of a trunk or main part, A, with the parts C D immovably attached at right angles thereto, with the removable anvil-block, adjustable leveling-screws, and adjustable arbor, as shown and described.

2. The combination, with the saw-bench A, as described, of the endless screw B, the traversing slide $a$, and the adjustable arbor or mandrel $a'$, pivoted thereto and adapted to hold a saw in either a vertical or horizontal position, substantially as and for the purpose set forth.

3. The combination, with arbor $a'$, of the collar $a^2$, provided with the sleeve $a^6$, the collar $a^3$, and the clamping-nut $a^7$, substantially as and for the purpose set forth.

4. The combination, with a saw-bench, as herein shown and described, of the detachable and adjustable upset $c'$ and the detachable and adjustable jointer D', substantially as set forth.

MILO COVEL.

Witnesses:
L. M. FREEMAN,
L. B. COUPLAND.